US008089991B2

(12) United States Patent
Ungermann (10) Patent No.: US 8,089,991 B2
(45) Date of Patent: Jan. 3, 2012

(54) NETWORK AND METHOD FOR CLOCK SYNCHRONIZATION OF CLUSTERS IN A TIME TRIGGERED NETWORK (75) Inventor: Joern Ungermann, Aachen (DE)

(73) Assignee: NXP B.V., Eindhoven (NL)

( * ) Notice: Subject to any disclaimer, the term of this patent is extended or adjusted under 35 U.S.C. 154(b) by 192 days.

(21) Appl. No.: 12/440,390

(22) PCT Filed: Aug. 28, 2007

(86) PCT No.: PCT/IB2007/053430
§ 371 (c)(1),
(2), (4) Date: Mar. 6, 2009

(87) PCT Pub. No.: WO2008/029319
PCT Pub. Date: Mar. 13, 2008

(65) Prior Publication Data
US 2009/0279651 A1 Nov. 12, 2009

(30) Foreign Application Priority Data
Sep. 6, 2006 (EP) ..................................... 06120215

(51) Int. Cl.
*H04J 3/06* (2006.01)
*H04J 3/00* (2006.01)
*H04L 7/00* (2006.01)
(52) U.S. Cl. ......................... 370/503; 370/521; 375/354
(58) Field of Classification Search .................. None
See application file for complete search history.

(56) References Cited

U.S. PATENT DOCUMENTS

| 3,798,650 | A | 3/1974 | McComas et al. |
| 7,356,617 | B2 * | 4/2008 | Suzuki et al. ................. 709/248 |
| 2005/0159174 | A1 * | 7/2005 | Bar-On et al. ............. 455/456.6 |
| 2007/0116058 | A1 * | 5/2007 | Rausch et al. ................ 370/503 |
| 2008/0046774 | A1 * | 2/2008 | Hirai et al. ..................... 713/500 |

FOREIGN PATENT DOCUMENTS

| EP | 0223031 | A2 | 5/1987 |
| EP | 1280024 | A1 | 1/2003 |
| GB | 2404121 | A | 1/2005 |
| WO | 2004105278 | A2 | 12/2004 |
| WO | 2005013523 | A1 | 2/2005 |

OTHER PUBLICATIONS

Hartwich, F., et al; "Timing in the TTCAN Network"; Internet Citation; Mar. 6, 2002; XP002242380; Retreived From: http://web.archive.org/web/20020306003128/http://www.can-cia.de/an/ttca; retrieved on May 23, 2003.

* cited by examiner

Primary Examiner — Xavier Szewai Wong (57) ABSTRACT

An embodiment of the invention includes a method and network for clock synchronization within a time triggered network using time slots, having at least two clusters. The clusters are connected to a coupling unit that includes a clock alignment control logic. The clock alignment control logic includes a coupling unit clock source which is more accurate than the node clock source. The accuracy of the coupling unit clock source is due to the coupling unit clock source including an oscillator crystal with smaller guaranteed deviations than the guaranteed deviations of the node clock source and/or the coupling unit clock source receiving a clock signal from an external clock device or from a GPS device. The method includes using a rate correction for offset correction.

15 Claims, 4 Drawing Sheets

NETWORK AND METHOD FOR CLOCK SYNCHRONIZATION OF CLUSTERS IN A TIME TRIGGERED NETWORK

The invention relates to a network operating on a time triggered protocol using time slots, wherein at least two clusters are included in the network, each cluster includes at least a node. Further, it relates to a method for clock synchronization within a time triggered network.

Modern communication systems generally do not consist of a single communication domain. Instead, multiple such communication domains are connected possibly each using a different communication protocol.

Current automotive networks generally consist of multiple CAN and LIN clusters interconnected by gateway nodes. These protocols are not prepared for exchanging safety-relevant information in real time. Since the demand for safety-relevant functions realized within automobiles increases, the need to connect safety-relevant nodes with a network is further increased. Therefore safety-relevant protocols need to be integrated into such networks. Especially, multiple safety-relevant communication clusters have to be interconnected. When multiple communications cluster are used in the same environment without further coordination each communications cluster has its own timing, meaning that each cycle length is different and that the cycle starts are not synchronized. Even when the communications clusters are configured identically, due to the nature of the distributed startup and the cluster internal clock synchronization or due to oscillator inaccuracies, these parameters will drift apart resulting in unsynchronized clusters. However, the transmission of safety-relevant in real time requires tightly synchronized clusters.

It is therefore known to use communication units in form of gateways or cluster couplers that have access to all such communication clusters. Such coupling units can naturally distribute information for aligning the communication clusters, but these mechanisms are working slowly as not to disturb the ongoing communications. EP 1280024 A1 describes a method for clock synchronization in a distributed time triggered network. The local clocks of the nodes are adjusted by using of offset correction values and clock rate corrections values. The clock rate correction values are calculated based on a set of clock rate deviations between the local clock and the clocks of other nodes.

Thus, it is an object of the present invention to provide a network and a method reducing the amount of time needed for aligning multiple communication clusters as much as possible.

The object is solved by the features of the independent claims.

The invention is based on the thought, that by using a central clock alignment control logic having a clock source with higher accuracy than the accuracy of the clock source in the node the deviation of cycle length and offset in the timing of the clusters is adjusted really faster without having the risk to force a node within the clusters out of the timing limits. Since the coupling unit clock source is estimating a standard cycle length more accurate than the nodes within the clusters it is possible to change the rates and/or the offsets in the clusters by use of most possible steps. Thereby, guaranteeing the operation of all nodes in the clusters.

According to the invention the network is operating on a time triggered protocol using time slots meaning the time is sliced into recurring cycles, wherein each cycle consist of several segments. Each cycle has a cycle length, a cycle start and cycle end. The network is composed of at least two clusters, wherein each cluster includes at least one node. A node maybe realized as application having a certain task within the network, e.g. a sensor for measuring a state within the vehicle. Each node includes a communication controller having an own node clock source for determining a timing of the node. The clusters of the networks are coupled by use of a coupling unit. The coupling unit maybe realized as gateway or cluster coupler. Each coupling unit includes a clock alignment control logic comprising a coupling unit clock source which is more accurate than the node clock source, wherein the coupling unit clock source is used for aligning the timing between the at least two clusters.

Gateways or cluster couplers in between multiple time-triggered communication clusters are used to synchronize those networks to achieve low propagation delay and to minimize memory requirements. By using protocols like the time-triggered FlexRay protocol external or central clock corrections means could be used to achieve a faster synchronization. The invention proposes an architecture and algorithm to significantly speed up the synchronization between multiple communication clusters by more than tenfold and thereby first enables the use of longer communication cycle times than 2 ms in such environments.

Further advantageous implementations and embodiments of the invention are set forth in the respective sub claims.

In a preferred embodiment the coupling unit includes as many protocol engines as clusters connected to coupling unit. Each protocol engine provides the timing of the connected cluster to the clock alignment control logic. Thus, the clock alignment control logic is able to change the cycle length or offset of the timing within the connected clusters. The change is achieved by increasing or decreasing a cycle length $\lambda$ in the connected clusters depending on the information provided by the protocol engines, wherein the start and/or end of a cycle in the connected clusters is shifted depending on the information provided by the protocol engines. By using a more accurate clock source in the central alignment control logic it is possible to align the rates of the cycles in the clusters for offset correction without forcing the timing of the nodes outside predetermined limits.

By combining the increasing or decreasing of the cycle length $\lambda$ in the connected clusters and the shifting of the cycle start and/or cycle end in the connected clusters based on the accurate clock source depending on the information provided by the protocol engines a faster alignment of the timing within the connected clusters could be achieved. The speed up is achieved, in particular, by using a rate alignment for correcting the offset. Due to the accurate clock source the rate alignment of the central alignment control logic will efficient amend the consecutive cycles within the clusters without disturbing the cycle length in the clusters so much, that nodes will terminate due to deviate from predetermined limits.

According to a further embodiment it is only allowed for the cluster coupler extend the cycle length by a predetermined maximum amount $\rho_{cum}$ of time. The predetermined maximum amount $\rho_{cum}$ depends on the accuracy of the precise coupling unit clock source. Only due to the more precise coupling unit clock source the predetermined maximum amount $\rho_{cum}$ is larger than 0, thereby enabling an adaptation of the cycle length for offset correction. Thus, the cluster coupler can control the increasing or decreasing of the cycle length to stay within the range around the nominal cycle length and within the limits of the nodes.

Due to restrictions of the time triggered protocol the clock alignment control logic may increase or decrease the cycle length $\lambda$ in the connected clusters only by a predetermined maximum amount $\rho$ of cycle length modification between two cycles. Thus, it is guaranteed not to disturb the ongoing traffic by forcing the timing too much in one direction.

The same applies for the shifting of the cycle start and/or cycle end in the connected clusters. Also the cycle start and/or cycle end maybe shifted by maximum amount of offset σ only depending on the information provided by the protocol engines.

In particular it is preferred if the more accurate coupling unit clock source signal is received from an external clock device or from a GPS device having a very accurate clock. Thus, it is not required to incorporate an expensive oscillator into the coupling unit.

The object is also solved by a method for clock synchronization within a time triggered network using time slots, having at least two clusters, wherein each cluster includes at least one node, each node comprises a node clock source and a communication controller and the clusters are connected to a coupling unit having a clock alignment control logic comprising a coupling unit clock source which is more accurate than the node clock source, the method comprising the steps of: monitoring the timing of the connected clusters within the coupling unit; increasing or decreasing a cycle length λ of the timing within the clusters by use of coupling unit clock source.

In a preferred embodiment the method for clock synchronization, comprising further the step of monitoring the timing within the respective cluster by each node, wherein as long as the timing is within predetermined limits no action of a communication controller of the node is required, wherein if the timing within the cluster differs from the timing limits the node will terminate. Thus, it is achieved that in case of forcing the timing in a cluster too much in one direction the nodes will recognize this deviation and will terminate to not disturb the traffic.

The invention is described in detail below with reference to the accompanying schematic drawings. In the drawings it is shown.

Figure 1:
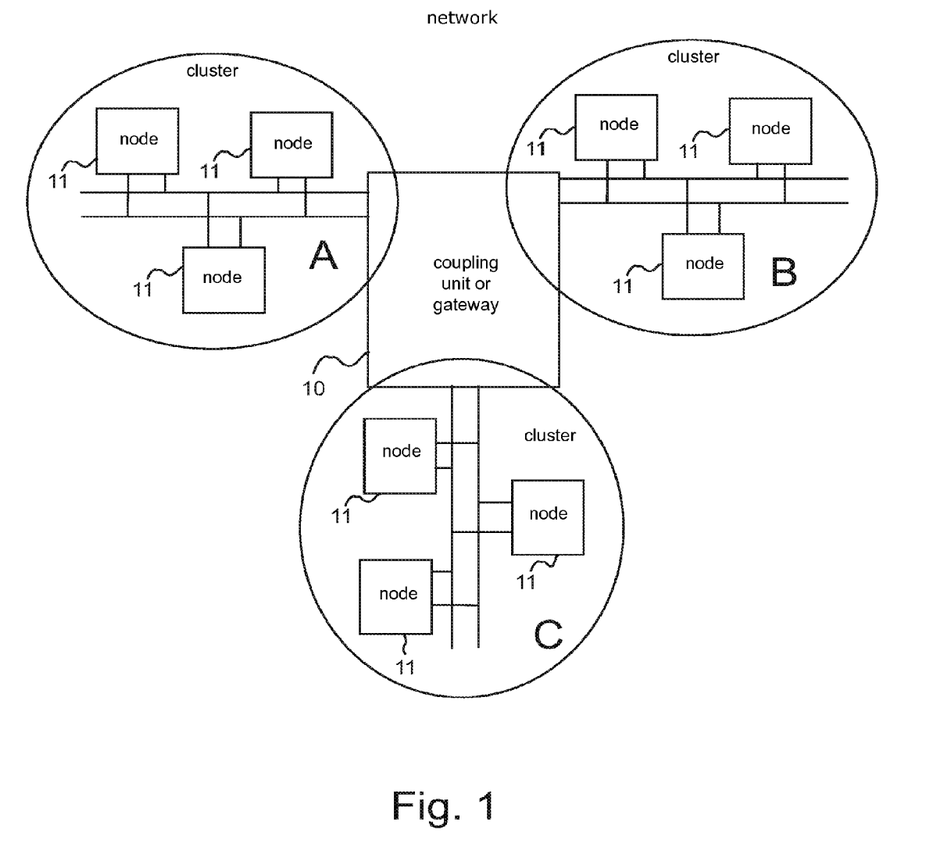
FIG. 1 a network including a plurality of clusters having a plurality of nodes.
Figure 2:
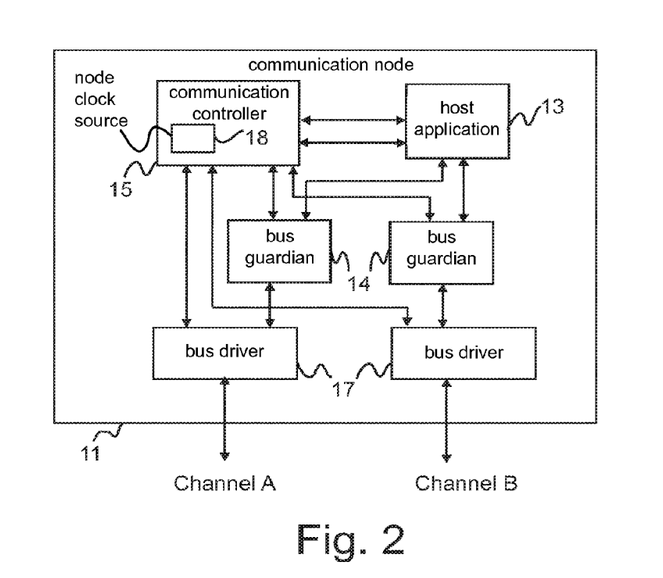
FIG. 2 a configuration of a node according as used in FlexRay environment.

A typical fault-tolerant time-triggered network, as illustrated in FIG. 1, consists of two or more communication channels Channel A, Channel B, to which communication nodes 11 are connected. FIG. 2 illustrates a node 11 as used in the time-triggered network. Each of those nodes 11 consists of bus drivers 17, a communication controller 15, a bus guardian device 14 for each bus driver 17 and the application host 13. The bus driver 17 transmits the bits and bytes that the communication controller 15 provides onto its connected channel and in turn provides the communication controller 15 with the information it receives on the channel. The communication controller 15 is connected to both channels and delivers relevant data to the host application 13 and receives data from it that it in turn assembles to frames and delivers to the bus driver 17. The communication controller 15 is mainly composed of a protocol engine and a controller host interface (not illustrated). The controller host interface is responsible for buffer management and data transfer between the host application 13 and the communication controller 15.

Those networks systems are at least partially time-triggered, meaning that the time is sliced into recurring cycles, where each cycle consists of several segments. Each node 11 determines the start of a new cycle according to its own built-in clock 18. At least one segment is divided into a fixed number of slots, where each slot is assigned up to at most one communication controller 15, wherein that communication controller 15 and alone that communication controller 15 has the right to transmit. Other segments of the cycle can be used for dynamic arbitration schemes or other purposes.

The bus guardian 14 is a device with an independent set of configuration data that enables the transmission on the bus only during those slots, which are specified by the configuration set.

The host application 13 contains the data source and sink and is generally not concerned with the protocol activity. Only decisions that the communication controller 15 cannot do alone are made by the host application 13.

A single node 11, called cold-starting node 11, initiates a communication schedule by transmitting startup/synchronization information to the bus, i.e. startup frames for FlexRay. This node 11 is selected either by configuration or by some algorithm, that determines which of several potential nodes 11 performs the startup. This algorithm generally consists of transmitting frames or similar constructs over the attached channels, whenever no existing schedule could be detected.

The communication controller 15 of the (potential) cold-starting node 11 thereby has to listen to all attached channels and has to transmit its startup data on all attached (potentially redundant) channels at the same time. There is only one single control logic for the startup inside the communication controller 15 for all attached channels.

Each other node 11 within the cluster listens to its attached channels. If it receives specific frames or similar constructs indicating a startup it will adopt the timing scheme from the observed communication and integrate into the network.

Two exemplary systems match to this description, e.g. the TTP (time triggered protocol) and the FlexRay protocol.

The node clock source 18 has a predetermined accuracy depending on the quality of the oscillator. Since each node has its own node clock source having different accuracies the cycle length in each node will be different. Thus, the synchronization between the nodes needs to be maintained by a synchronization algorithm.

Figure 3:
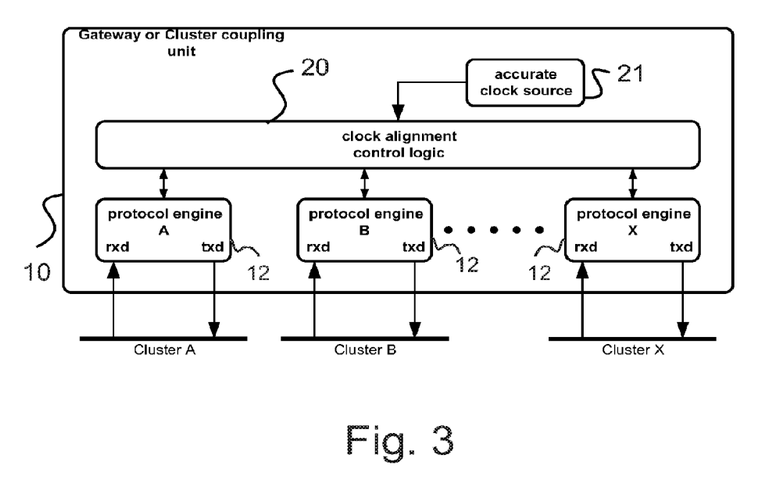
FIG. 3 a schematic block diagram of a coupling unit according to the invention.

FIG. 3 illustrates an inventive coupling unit 10 or gateway, which is connected to a plurality of clusters A-X. There are three protocol engines 12 connected to the clusters A, B, X, respectively. The protocol engines 12 monitor the timing of each cluster. These timings are provided to the central clock alignment control logic 20. The coupling unit 10 also includes a coupling unit clock source 21 having a higher accuracy than the clock sources 18 within the nodes 11 in the clusters A, B, X.

Now the central synchronization of a plurality of clusters connected to a coupling unit 10 will be described in more detail.

In a situation, where multiple communication clusters A, B, X need to be synchronized, a coupling unit 10 has access to all communication clusters. This invention describes how such a coupling unit 10 can be modified to significantly speed up the synchronization of the independently started attached communication clusters.

The synchronization of multiple communication clusters encompasses to different values: clock rate and clock offset. The rate influences the cycle length and the offset the phase difference of the cycles. Both need to be closely aligned for the synchronization to be stable. If the rate or cycle length is not closely aligned, it is difficult to keep the offset or phase in check, while the offset needs to be small to reduce the propagation delay for intercommunication between the communication clusters and the required memory for message storage in a gateway component.

The explanation of the invention is made in respect to the FlexRay protocol. However the invention is not limited to the FlexRay protocol. The rate difference will generally be small and easier to compensate than the offset. For the FlexRay protocol there is a fixed maximum deviation of the cycle length of ±1500 ppm. For other protocols similar upper boundaries can be easily found or defined. Be $\lambda$ the ideal length of a cycle, then $2\lambda(1500/1000000)$ is the maximum necessary rate correction for FlexRay, while for offset $\lambda/2$ is the maximum. As can be seen the necessary rate correction is smaller by several orders of magnitude and is therefore neglected.

The amount of possible offset correction per cycle is also generally limited, especially regarding shortening a cycle. Also lengthening is generally restricted, since else the regular transmission of messages becomes distorted. Therefore it is practical to use the possibility to influence the cycle length to help correcting the offset.

Let $\rho$ be the maximum amount that the cycle length may be modified between any two cycles and $\sigma$ the maximum amount of offset that can be corrected at the end of any cycle. Please note the fundamental difference between the two methods of influencing the cycle length. The rate correction proportionally influences all time slots in a cycle, while the offset correction only changes a dedicated interval during the cycle, leaving all others intact. Thereby the rate correction enables closer alignment of all time slots, not only the one following the offset correction.

For FlexRay, the specification prescribes a maximum for both $\rho$ and $\sigma$ of 7 'microticks', wherein a microtick is defined time amount of 25 ns. For alignment within a cluster, larger shifts of the cycle length are possible, but $\rho$ and $\sigma$ for the correction of the rate and/or the offset give the additional correction driven from a higher layer by the central alignment control logic 21. Thus, the central alignment control logic 21 may only use these values of 7 microticks to correct the rate and/or the offset among the clusters.

The cycle length can be influenced once in each correction period and changes to it accumulate. Thereby cycle length can be used to shift the offset much faster than using only the offset correction on its own.

To shift two communication clusters by $\lambda/2$, the offset correction needs obviously $\lambda/(4*\sigma)$ correction periods to shift each cluster by cycle $\lambda/4$.

Using only rate correction and assuming that the cycle lengths are initially already synchronized to simplify the equation, this can be accomplished using approximately only $$-1 + \sqrt{1 + \frac{\lambda}{\rho}}$$

cycles. Thereby, for each cycle the rate of one cluster is enlarged while the one of the other is diminished until half the offset is corrected. Then the rates are being aligned again. So the unrestricted rate correction is more effective whenever the cycle length is $$\lambda > 8\sigma\left(\frac{2}{\rho} - 1\right).$$

Since the maximum correction for the offset $\sigma$ is generally very small compared to the cycle length $\lambda$, using rate correction is nearly always more effective than using offset correction, e.g. for FlexRay $\lambda$ may be up to 640000 μT (microticks) while $\sigma$ is restricted to be smaller or equal to 7 μT.

However, offset correction may be used additionally, which reduces the amount of cycles to $$-\left(1 + \frac{2\sigma}{\rho}\right) + \sqrt{\left(1 + \frac{2\sigma}{\rho}\right)^2 + \frac{\lambda}{\rho}}.$$

However, by using one of the latter two algorithms there may be a problem with the precautions against the cycle length being changed too much from the nominal value. During central alignment of the timing of the clusters the cycle length within the clusters may not be changed so much that a node measuring the cycle length with respect to its local clock detects a deviation from the nominal cycle length so large that it assumes itself to be faulty. Each node operating based on a certain protocol has predetermined limits for the deviation of the cycle length. For FlexRay these limits are ±3000 ppm (double of the nominal clock frequency deviation). Within these limits the node will operate and will adapt to the alignment of the central coupling unit. However, if the alignment of the central coupling unit forces the cycle length of a node out of these limits the node will terminate.

The following example will explain this. Assume two nodes and the gateway. One node has +1500 ppm deviation, one node has −1500 ppm deviation and the cluster coupler has −1500 ppm deviation from the nominal cycle length. If the cluster coupler influences the cycle length by additional −100 ppm, then the node having +1500 ppm deviation would measure a cycle length deviation of 3100 ppm and assume itself to be faulty, while the node having −1500 ppm deviation would measure 100 ppm and be fine.

Taking this into account reduces the effectiveness a bit as will be pointed out. Generally each node, in particular the communication controller 15 observes its own rate or cycle length and determines that it is faulty if this rate or cycle length leaves a certain range. This range is normally determined using estimation about the quality of the used oscillators or similar clock sources. Without the invention this problem usually prevents using a rate correction to speed up the offset correction, since any meddling with the rate may result in any node of the cluster exceeding its own target range.

However at this point the invention will be used. By using a more accurate clock source 21 in the central alignment control logic 20 this problem can be solved, since the central node 10 steering the clock alignment has access to a superior clock source 21. This coupling unit clock source 21 may either be a more expensive oscillator crystal with smaller guaranteed deviations, or a source externally derived, e.g. from GPS, or by extensive measurement and characterization of a specific clock source, so its deviation under known circumstances can be accurately estimated. This invention disclosure does not restrict the superior clock source to be from this list.

The real cycle length in a cluster must be always allowed to deviate up to the maximum allowed oscillator deviation (e.g. for FlexRay ±1500 ppm). These extremes are defined to be $\lambda_{max}$ and $\lambda_{min}$. As long as the current cycle length stays within these boundaries, no node will generate an exception and terminate. The coupling unit 10 including the clock alignment control logic 20 generally tries to align all cycle lengths of the clusters to its own view of what is the nominal cycle length $\lambda'$. As long as this coupling unit node 10 is not faulty, it follows $\lambda_{min} \leq \lambda' \leq \lambda_{max}$.

How much rate correction can be used to speed up the offset correction is thereby much dependent on how accurate the guess of the clock aligning node is about $\lambda'$. Be $\theta$ the accuracy of this guess so that $$\lambda_{min} < \lambda - \theta \leq \lambda' \leq \lambda + \theta < \lambda_{max}$$

Then it can reduce the rate of aligned communication clusters by up to $\rho_{cum\_dec} = \lambda - \theta - \lambda_{min}$ and increase by up to $\rho_{cum\_inc} = \lambda_{max} - \lambda - \theta$ without leaving the allowed cycle length range or limits as mentioned above, wherein $\rho_{cum\_inc}$ is the maximum amount of time that the clock aligning node 10 may lengthen the cycle length of an attached cluster without it becoming larger than $\lambda_{max}$ and $\rho_{cum\_inc}$ is the maximum amount of time that the clock aligning node may shorten the cycle length of an attached cluster without it becoming smaller than $\lambda_{min}$.

Assuming that $\rho_{cum\_dec} = \rho_{cum\_inc} = \rho_{cum}$, and that $\rho_{cum} < \lambda/8$, rate correction can then be performed in $$\frac{\lambda}{4\rho_{cum}} + \frac{\rho_{cum}}{\rho} - 1 \text{ cycles.}$$

By additional using offset correction the rate correction can be performed in $$\frac{\lambda}{4(\rho_{cum} + \sigma)} + \frac{\rho_{cum}^2}{\rho(\rho_{cum} + \sigma)} - 1 \text{ cycles.}$$

Thus by using the more accurate clock source 21 within the coupling unit 10 it is possible to use the more effective a rate correction for offset correction without leaving the limits. Thereby, the alignment of the timings in the clusters maybe speed up drastically.

If the clock source 18 in the nodes 11 would be also more accurate this invention will not work, since the rate correction will force the timing of the nodes out of the limits.

It is very advantageous, since only the clock source of the coupling unit 10 requires higher costs. No further amendments need to be performed. By providing a very accurate clock source from outside, e.g. GPS the central coupling unit does not need to have such own accurate clock source.

Based on FIGS. 4-8 the effects of the invention are illustrated in comparison to the conventional central alignment.

Figure 4:
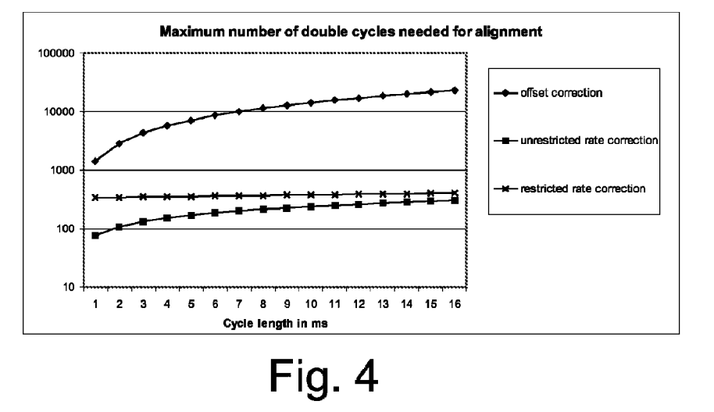
FIG. 4 a diagram of the maximum number of double-cycles needed for alignment.

Referring to FIG. 4 the maximum number of double cycles needed for alignment is shown. It is assumed that rate and offset may be influenced by up to 175 ns per double cycle (that are 7 microticks for a microtick length of 25 ns) and that the clock of the aligning coupling unit 10 has a worst case deviation of only ±750 ppm compared to ±1500 ppm for the other nodes. Naturally the performance increases, if an even more accurate clock is used. As could be easily seen by using the conventional offset correction a drastically higher number of double cycles is necessary to align the timing of the connected clusters by using a conventional offset correction. In FIG. 4 two curves are shown illustrating the application of the more accurate clock source. There is an unrestricted curve illustrating the application of rate correction for offset correction. The unrestricted curve is valid for the first set of formulas, which do not observe the limitation to cycle length imposed by the self-checking of the nodes. Further, there is a restricted curve illustrating a rate correction by using the limitation of cycle length and the checking of the limits within the nodes. By using the restricted rate correction the cycle length adjustment is restricted by clock improvements of cluster coupler.

Figure 5:
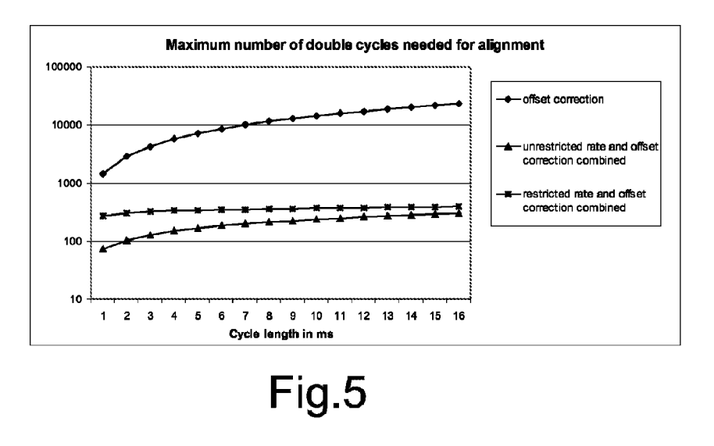
FIG. 5 a diagram illustrating the achievable speedup by using the method or the network according to the invention.

The following FIG. 5 illustrates an unrestricted and a restricted curve using a combination of rate and offset correction in comparison with the conventional offset correction. It is shown that by using the unrestricted rate and offset correction the number of double cycles is the lowest. Note that for unrestricted rate and offset correction no limits are set within the nodes to be monitored. Thus, a faster alignment is possible since no limits need to be considered when adjusting the cycle length.

Figure 6:
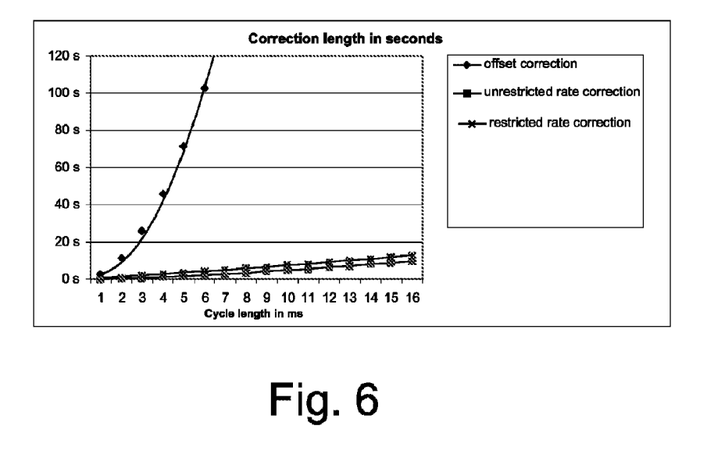
FIG. 6 a diagram illustrating the correction length by using the method or the network according to the invention.

FIG. 6 shows the amount of time passing before the communication clusters are synchronized. As can be seen, even if the restricted rate correction is slower than the unrestricted optimum, in terms of real time passing, the difference is not so big. Essentially cycle times of more than 1 ms become feasible only with the proposed approach.

Figure 7:
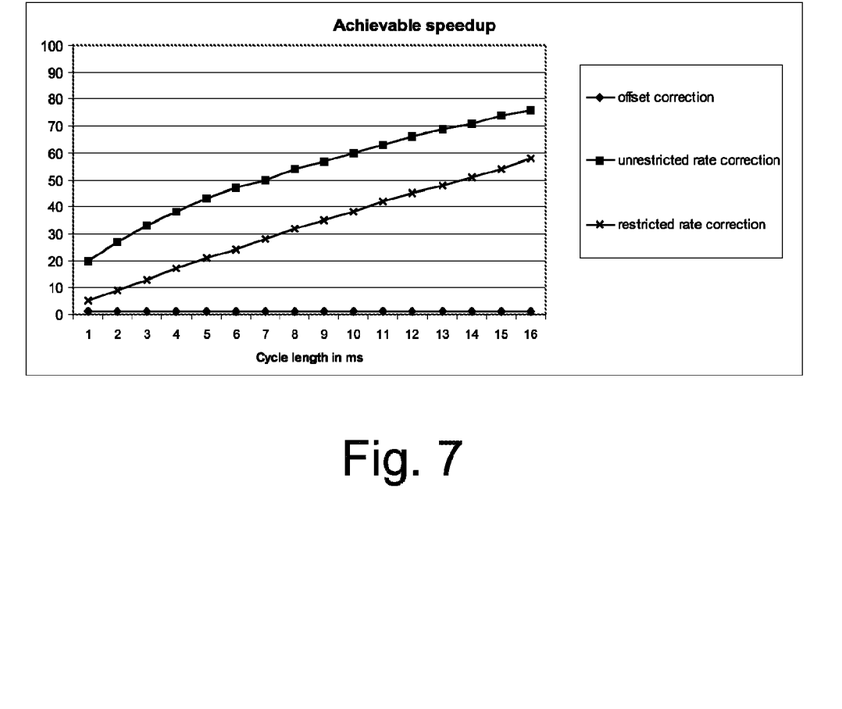
FIG. 7 a diagram illustrating the correction length by using the method or the network.
Figure 8:
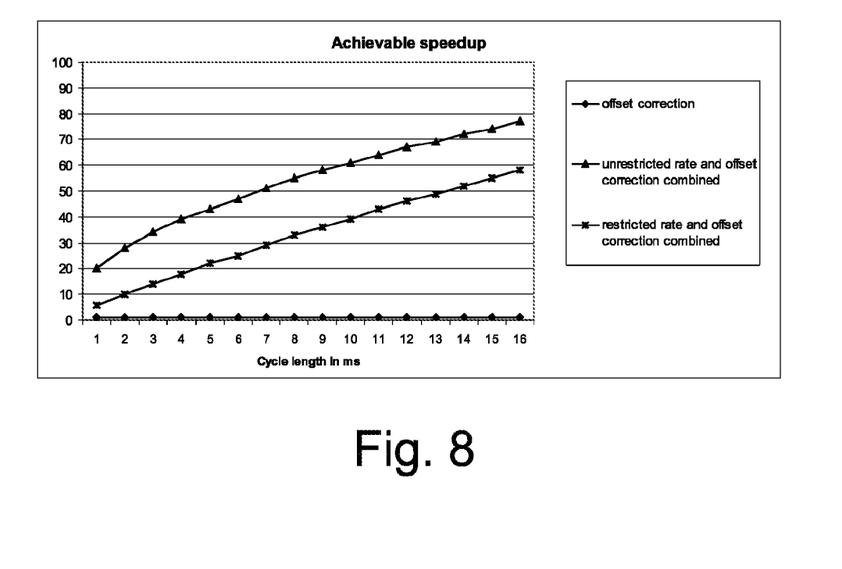
FIG. 8 a diagram illustrating the correction length by using the method or the network.

FIGS. 7 and 8 illustrate the achievable speed up factor for the same base parameters. The highest speed up is achieved by using a combined unrestricted rate and offset correction as shown in FIG. 8. In this case the values of $\rho$ and $\sigma$ of 7 'microticks' are not used. The values $\rho$ and $\sigma$ of 7 'microticks' are defined in the FlexRay protocol due to several reasons. However, just for speeding up the alignment of the clusters by use of the more accurate clock source 21 in the cluster coupler is possible without such limitations of the values $\rho$ and $\sigma$ to 7 'microticks'. Nevertheless, in comparison with the conventional offset correction the gain could be easily recognized.

In the following derivation of the formulas as used above is explained in more detail. To compensate for an offset difference of $\lambda/2$, both communication clusters need to be shifted by $\lambda/4$. As mentioned above a rate correction is cumulative. Be m the searched number of cycles (assumed to be divisible by 2 for simplicities sake), then it follows:

$$\frac{\lambda}{4} = \sum_{i=1}^{m/2} \sum_{j=1}^{i} \rho + \sum_{i=1}^{m/2} \sum_{j=1}^{m/2-i+1} \rho$$

$$= \rho \left( \sum_{i=1}^{m/2} i + \sum_{i=1}^{m/2} \frac{m}{2} - i + 1 \right)$$

$$= \rho \left( \frac{m^2 + 2m}{8} + \frac{m^2}{4} + \frac{m}{2} - \frac{m^2 + 2m}{8} \right)$$

$$= \rho \left( \frac{m^2 + 2m}{4} \right)$$

$$0 = m^2 + 2m - \frac{\lambda}{\rho}$$

$$m_{1,2} = -1 \pm \sqrt{1 + \frac{\lambda}{\rho}}$$

If the maximal correction of cycle length for offset alignment is restricted by $\rho_{cum}$, then the following gives the necessary number of correction periods $$\frac{\lambda}{4} = m\sigma + \sum_{i=1}^{m/2}\sum_{j=1}^{i}\rho + \sum_{i=1}^{m/2}\sum_{j=1}^{m/2-i+1}\rho$$

$$= m\sigma + \rho\left(\sum_{i=1}^{m/2} i + \sum_{i=1}^{m/2}\frac{m}{2} - i + 1\right)$$

$$= m\sigma + \rho\left(\frac{m^2+2m}{8} + \frac{m^2}{4} + \frac{m}{2} - \frac{m^2+2m}{8}\right)$$

$$= m\sigma + \rho\left(\frac{m^2+2m}{4}\right)$$

$$0 = m^2 + \left(2 + \frac{4\sigma}{\rho}\right)m - \frac{\lambda}{\rho}$$

$$m_{1,2} = -\left(1 + \frac{2\sigma}{\rho}\right) \pm \sqrt{\left(1 + \frac{2\sigma}{\rho}\right)^2 + \frac{\lambda}{\rho}}$$

Using these variables, the time for correction amounts to $$\frac{\lambda}{4} = \sum_{i=1}^{\rho_{cum}/\rho}\sum_{j=1}^{i}\rho + \left(m - 2\frac{\rho_{cum}}{\rho}\right)\rho_{cum} + \sum_{i=1}^{\rho_{cum}/\rho}\sum_{j=1}^{\rho_{cum}/\rho-i+1}\rho$$

$$= \rho\left(\frac{\rho_{cum}^2}{\rho^2} + \frac{\rho_{cum}}{\rho}\right) + \left(m - 2\frac{\rho_{cum}}{\rho}\right)\rho_{cum}$$

$$= \frac{\rho_{cum}^2}{\rho} + \rho_{cum} + m\rho_{cum} - 2\frac{\rho_{cum}^2}{\rho}$$

$$m = \frac{1}{\rho_{cum}}\left(\frac{\lambda}{4} + \frac{\rho_{cum}^2}{\rho} - \rho_{cum}\right)$$

$$= \frac{\lambda}{4\rho_{cum}} + \frac{\rho_{cum}}{\rho} - 1$$

And including offset correction:

$$\frac{\lambda}{4} = m\sigma + \sum_{i=1}^{\rho_{cum}/\rho}\sum_{j=1}^{i}\rho + \left(m - 2\frac{\rho_{cum}}{\rho}\right)\rho_{cum} + \sum_{i=1}^{\rho_{cum}/\rho}\sum_{j=1}^{\rho_{cum}/\rho-i+1}\rho$$

$$= m\sigma + \rho\left(\frac{\rho_{cum}^2}{\rho^2} + \frac{\rho_{cum}}{\rho}\right) + \left(m - 2\frac{\rho_{cum}}{\rho}\right)\rho_{cum}$$

$$= m\sigma + \frac{\rho_{cum}^2}{\rho} + \rho_{cum} + m\rho_{cum} - 2\frac{\rho_{cum}^2}{\rho}$$

$$m = \frac{1}{\rho_{cum}+\sigma}\left(\frac{\lambda}{4} + \frac{\rho_{cum}^2}{\rho} - \rho_{cum}\right)$$

$$= \frac{\lambda}{4(\rho_{cum}+\sigma)} + \frac{\rho_{cum}^2}{\rho(\rho_{cum}+\sigma)} - 1$$

Thus, by using the invention it is possible only with one more accurate clock source in the cluster coupler to achieve a very strong time reduction for synchronizing different cluster within a time triggered network.

The invention claimed is:

1. A network operating on a time triggered protocol using time slots, wherein the network comprises at least two clusters, each cluster comprising at least a node, wherein the node comprises a communication controller comprising a node clock source for determining a timing for the node, wherein the clusters are connected to a coupling unit comprising a clock alignment control logic comprising:
a coupling unit clock source which is more accurate than the node clock source,
wherein the accuracy of the coupling unit clock source is due to at least one of:
the coupling unit clock source comprising an oscillator crystal with smaller guaranteed deviations than guaranteed deviations of the node clock source; or
the coupling unit clock source receiving a clock signal from an external clock device or from a GPS device,
wherein the coupling unit clock source is used for aligning the timing between the at least two clusters,
wherein the clock alignment control logic increases or decreases cycle length $\lambda$ in the connected clusters by amount $\rho$ of cycle length modification between two cycles and/or the clock alignment control logic shifts a cycle start and/or a cycle end in the connected clusters by amount of offset $\sigma$, wherein the clock alignment control logic shifts by depending on information provided by a protocol engine connected to each of the clusters, wherein the clock alignment control logic uses a rate correction for offset correction.

2. The network as claimed in claim 1, wherein the coupling unit comprises as many of the protocol engines as there are clusters that are connected to the coupling unit, wherein each of the protocol engines provides timing of the connected cluster to the clock alignment control logic.

3. The network as claimed claim 1, wherein the clock alignment control logic is increasing or decreasing the cycle length $\lambda$ in the connected clusters depending on the information provided by the protocol engines.

4. The network as claimed in claim 1, wherein the clock alignment control logic increases or decreases the cycle length $\lambda$ in the connected clusters but keeps the cycle length $\lambda$ inside a predetermined range around a nominal cycle length as defined by the more accurate clock source depending on the information provided by the protocol engines.

5. The network as claimed in claim 1, wherein the greater accuracy of the coupling unit clock source is due to the coupling unit clock source comprising a clock source with a more precise measuring capability than the node clock source.

6. The network as claimed in claim 1, wherein the greater accuracy of the coupling unit clock source over the node clock source is due to the coupling unit clock source comprising an accurately estimated deviation under known circumstances, the deviation having been extensively measured and characterized.

7. The network as claimed in claim 1, wherein the amount $\rho$ of cycle length modification is within a predetermined range below or equal to a maximum amount.

8. The network as claimed in claim 1, wherein the amount of offset $\sigma$, is within a predetermined range below or equal to a maximum amount.

9. A method for clock synchronization within a time triggered network using time slots, comprising at least two clusters, wherein each cluster comprises at least one node, each node comprises a node clock source and a communication controller, wherein the clusters are connected to a coupling unit comprising a clock alignment control logic, wherein the clock alignment control logic comprises a coupling unit clock source which is more accurate than the node clock source, the method comprising:
monitoring timing of the connected clusters within the coupling unit; and increasing or decreasing a cycle length λ of the timing within the clusters by amount ρ of cycle length modification between two cycles, wherein the increasing or the decreasing depends upon information from the coupling unit clock source, wherein the accuracy of the coupling unit clock source is due to at least one of:
- the coupling unit clock source comprising an oscillator crystal with smaller guaranteed deviations than guaranteed deviations of the node clock source; or
- the coupling unit clock source receiving a clock signal from an external clock device or from a GPS device;

shifting a cycle start and/or a cycle end in the connected clusters by amount of offset σ, wherein the shifting depends upon information from the coupling unit clock source;

using a rate correction for offset correction.

10. The method for clock synchronization as claimed in claim 9, further comprising:
monitoring the timing within the respective cluster by each node, wherein as long as the timing is within predetermined limits no action of the communication controller of the node is required, wherein if the timing within the cluster differs from the timing limits the node will terminate.

11. The method for clock synchronization as claimed in claim 9, wherein the greater accuracy of the coupling unit clock source is due to the coupling unit clock source comprising a clock source with a more precise measuring capability than the node clock source.

12. The method for clock synchronization as claimed in claim 9, wherein the greater accuracy of the coupling unit clock source over the node clock source is due to the coupling unit clock source comprising an accurately estimated deviation under known circumstances, the deviation having been extensively measured and characterized.

13. The method for clock synchronization as claimed in claim 9, wherein the clock alignment control logic increases or decreases the cycle length λ in the connected clusters but keeps the cycle length λ inside a predetermined range around a nominal cycle length as defined by the more accurate clock source depending upon information from the coupling unit clock source.

14. The method for clock synchronization as claimed in claim 9, wherein the amount ρ of cycle length increase or decrease is within a predetermined range below or equal to a maximum amount.

15. The method for clock synchronization as claimed in claim 9, wherein the amount offset σ is within a predetermined range below or equal to a maximum amount.

* * * * *